(12) United States Patent
Reinders

(10) Patent No.: US 7,583,618 B2
(45) Date of Patent: Sep. 1, 2009

(54) METHOD FOR ALLOCATING AN IDENTIFICATION CODE TO NODES IN A NETWORK, FOR COMMUNICATION IN A NETWORK AS WELL AS FOR CONTROLLING A NETWORK

(76) Inventor: Roelof Reinders, Keulschevaart 17, NL-3621 MX Breukelen (NL)

( * ) Notice: Subject to any disclaimer, the term of this patent is extended or adjusted under 35 U.S.C. 154(b) by 725 days.

(21) Appl. No.: 10/398,149

(22) PCT Filed: Sep. 25, 2001

(86) PCT No.: PCT/NL01/00707

§ 371 (c)(1),
(2), (4) Date: Sep. 4, 2003

(87) PCT Pub. No.: WO02/29502

PCT Pub. Date: Apr. 11, 2002

(65) Prior Publication Data

US 2004/0022232 A1    Feb. 5, 2004

(30) Foreign Application Priority Data

Oct. 5, 2000    (NL) ................................. 1016338

(51) Int. Cl.
*G05B 19/042* (2006.01)
*H04L 29/12* (2006.01)
(52) U.S. Cl. .................................... 370/257
(58) Field of Classification Search .......... 370/254, 370/255, 257, 258
See application file for complete search history.

(56) References Cited

U.S. PATENT DOCUMENTS

| | | | | |
|---|---|---|---|---|
| 4,689,786 A | * | 8/1987 | Sidhu et al. | 370/255 |
| 4,949,299 A | * | 8/1990 | Pickett | 710/105 |
| 4,953,194 A | * | 8/1990 | Hansen et al. | 379/25 |
| 5,030,948 A | * | 7/1991 | Rush | 340/7.46 |
| 5,371,897 A | * | 12/1994 | Brown et al. | 709/222 |
| 5,502,818 A | * | 3/1996 | Lamberg | 709/225 |
| 5,530,896 A | | 6/1996 | Gilbert | |
| 5,586,269 A | * | 12/1996 | Kubo | 340/825.52 |
| 5,835,723 A | * | 11/1998 | Andrews et al. | 709/226 |
| 5,978,854 A | * | 11/1999 | Fujimori et al. | 709/245 |
| 6,088,726 A | * | 7/2000 | Watanabe | 709/220 |
| 6,195,363 B1 | * | 2/2001 | Nakatsugawa | 370/455 |
| 6,304,557 B1 | * | 10/2001 | Nakazumi | 370/258 |
| 6,363,083 B1 | * | 3/2002 | Spielbauer et al. | 370/470 |
| 6,425,019 B1 | * | 7/2002 | Tateyama et al. | 710/11 |
| 6,560,217 B1 | * | 5/2003 | Peirce et al. | 370/351 |
| 6,823,399 B2 | * | 11/2004 | Horiguchi et al. | 710/6 |
| 6,987,726 B1 | * | 1/2006 | Elliott | 370/217 |
| 2003/0114160 A1 | * | 6/2003 | Verkama et al. | 455/445 |
| 2005/0038930 A1 | * | 2/2005 | Meier et al. | 710/15 |

FOREIGN PATENT DOCUMENTS

| | | |
|---|---|---|
| EP | 0 466 151 A1 | 1/1992 |
| EP | 0 524 036 A1 | 1/1993 |
| FR | 2 689 259 A1 | 10/1993 |

\* cited by examiner

*Primary Examiner*—Melvin Marcelo
(74) *Attorney, Agent, or Firm*—The Webb Law Firm

(57) ABSTRACT

The invention relates to a method for allocating a unique ID to a node in a network making a request to that effect, wherein the requesting node generates an ID and sends an ID request comprising the ID over the network, wherein each node in the network that already possesses said generated ID will send an ID ban comprising the generated ID over the network in response to detection of said ID request. The invention furthermore relates to a method for communication between objects in a network, in particular sensors, actuators and/or control objects. The invention furthermore relates to a method for controlling objects in a network, in particular sensors, actuators and/or control objects, wherein a controlling object sends a message comprising data on its characteristic variables over the network via data output means without being requested to do so.

9 Claims, No Drawings

METHOD FOR ALLOCATING AN IDENTIFICATION CODE TO NODES IN A NETWORK, FOR COMMUNICATION IN A NETWORK AS WELL AS FOR CONTROLLING A NETWORK

BACKGROUND OF THE INVENTION

1. Field of the Invention

The invention relates to a method for allocating a unique ID (identification code) to a node in a network making a request to that effect. The invention can be used in particular in industrial control networks, more in particular a Controller Area Network (CAN).

2. Description of the Related Art

Such a control network is used for controlling production processes, for example, or for controlling the climate and/or the lighting in buildings. The nodes in the network in particular comprise one or more sensors, actuators and control objects such as PID (proportional/integral/derivative) or other types of controllers. Furthermore, the network usually comprises a central control unit, such as a PLC, which controls the process.

It is common practice to give each node in the network at least one unique ID, so that said node can identify itself as part of the communication in the network. So far, the setting of the ID has often been effected manually, for example by means of dip switches. It is the installer's responsibility thereby that each ID within a network is unique, which implies that there is a real risk of errors and breakdowns, and in addition it is a laborious operation, in particular in the case of large networks. When two large networks are coupled, it requires a major effort and intense concentration on the part of installer to avoid errors.

SUMMARY OF THE INVENTION

A few general objectives of the invention are to provide a distributed process control, that is, a system which is less dependent on a central control unit, so that the processes on the control unit itself can have a simple structure and the amount of data traffic within the network can be reduced, to provide a process control wherein the making of changes in the network structures is simple and/or to provide a process control wherein maintenance of the network does not require much knowledge of network technology. An ultimate general objective of the invention is to provide a process control which can function without a central control unit.

More in particular it is an object of the invention to provide a simple yet reliable method of giving each node in a network its own unique ID, which preferably does not require a human operation and/or which reduces the risk of errors and breakdowns.

In order to accomplish these objectives, the requesting node generates an ID and sends an ID request comprising the ID over the network, wherein each node in the network that already possesses said generated ID will send an ID ban comprising the generated ID over the network in response to detection of said ID request. Unlike the process in conventional networks, the nodes thus play an active role in obtaining an ID, to which end the nodes may be provided with the haw and the software required to enable this process.

Preferably, the requesting node will generate a new ID in response to the ID ban and send a new ID request comprising the new ID over the network. In this way a repetitive process is created, which is continued until the node has obtained an ID.

When the requesting node has not detected an ID ban, the node will present an ID confirmation comprising the ID and a device identification on the network after a predetermined period of time. Said predetermined period of time preferably varies with each individual node, it is computed on the basis of the device identification (the serial number) of the object that forms the node, for example, in order to prevent a situation wherein two nodes simultaneously requesting the same ID, which may happen in the case of an ID reset, for example, both try to claim said ID for themselves. The ID that has been accepted as unique is preferably stored in permanent storage means.

Preferably, the requesting node will also generate a new ID when it has not been able to send the ID confirmation after a predetermined number of attempts, and it will send a new ID request comprising a new ID over the network. The fact of the matter is that the inability to send the ID confirmation may be an indication that another node is simultaneously trying to claim the ID by means of an ID confirmation. The result is that both nodes will make a new attempt with a different ID.

When the requesting node subsequently detects an ID confirmation comprising the same ID but a different device identification on the network, it will preferably determine that its ID is no longer unique and it will generate a new ID and send a new ID request comprising the new ID over the network. Both nodes will thus lose their ID. This is an additional safeguard to ensure that a situation wherein two nodes have obtained the same ID is corrected.

Preferably, the format of an ID ban and that of an ID confirmation are identical for that matter, so that a receiving node is unable to distinguish between the two. Consequently, an ID confirmation has the same effect as an ID ban on a node that has made an ID request comprising the ID in question.

Preferably, the ID is generated on the basis of at least part of the node's serial number. This reduces the risk of an identical ID being generated.

The invention is especially advantageous if a network is to be configured anew, as is the case when two networks are coupled, whereby a node sends an ID reset command over the network, in response to which at least substantially each node in the network will generate a new ID and send a new ID request comprising the new ID over the network.

A situation may occur wherein a node temporarily needs several ID's. In such a case it is advantageous if a node does not send an ID ban over the network in response to detection of an ID request comprising an ID it will no longer use, and no longer considers said ID as being its own, so that the ID will be available to the requesting node.

The invention furthermore relates to a method for communication between objects in a network, in particular sensors, actuators and/or control objects, wherein a sending object sends a message intended for one or more receiving objects by making use of data output means.

A known and obvious manner of sending such messages is to address the message by means of the ID's of the nodes to which the objects to which the message is to be sent are connected. It is a drawback thereby that it is necessary for the sending node to know the ID's in question. Furthermore it is difficult to find out the significance of messages upon analysis of the data traffic in the network, because the address is an abstract rather than an informative code. Such analysis is used for tracing errors in the process control and for further optimizing the process control. Furthermore it is difficult to address a group of objects having identical attributes in one go, because it must first be determined in that case which ID's are associated with that particular group of objects.

In this connection it is a special object of the invention to provide a simple, transparent and efficient manner of addressing objects in a network.

In order to accomplish that objective, at least substantially every receiving object in the network possesses a set of address fields which may comprise a non-unique address value, wherein the message is addressed by the sending object by prescribing one or more address values for one or more address fields, and wherein the message will be input by data input means of the receiving object if all the stated address values in the corresponding address fields of the object comply with the prescribed address values in the message. In this manner it is possible to address the objects in the network for their object attributes, which are presented by the address values in the address fields. This manner of addressing shows great similarity with the retrieval of data from a database, for example by means of a query language such as SQL. It is thereby possible to use so-called "wild cards". In particular, this way of communication makes it possible in a simple manner to retrieve the status of an object or a group of objects.

In order to be able to address each object individually on the basis of object attributes, the combination of address values of at least part of the set of address fields preferably identifies the receiving object in a unique manner.

Preferably, the address values constitute functional attributes, such as "emergency provision", "light", "horizontal actuator", "temperature sensor" and/or location attributes, such as "Installation 3", "Second floor", "Room 3" of the receiving object. This makes it possible in a simple and transparent manner, for example, to turn the lights in all rooms having room number 3 of all floors of a building on or off at one go by means of a single message, or to retrieve the status of all emergency provisions, without there being a need to know the ID's of the objects in question. The message that is sent can thus be a control command or a status information request. Furthermore, the control software need not be adapted as regards this point when new objects are being introduced into the network, because this method of addressing makes it possible to address new objects directly as regards their attributes.

The invention furthermore relates to a method of controlling objects in a network, in particular sensors, actuators and/or control objects. Generally, the control objects and actuators in a network are the objects being controlled. The controlling objects are generally the sensors and also the control objects. Also servomotors are an example of both controlling and controlled objects.

In a known method, the central control unit retrieves the status of the controlling objects, such as the sensors, and on the basis thereof it sends instructions to objects to be controlled, such as the actuators, for the purpose of adjusting or controlling the process. This method places a heavy load on the central control unit, in particular in the case of extensive and complicated networks, whereby the processes that take place in said central control unit can be very obscure to the system manager. The entire process is thereby controlled by the control unit, whereby it must be known exactly what objects are present in the network and in what way said objects are to react to each other, which makes it difficult to maintain an overview. Another drawback of this method is the possibility of a breakdown of the central control unit.

In this connection it is a special object of the invention to enable a simple, convenient and decentralized manner of controlling the objects in the network, to reduce the load on the central control unit, and/or to make it easier to make adjustments in the network without drastic changes in the software of the central control unit being required, and/or to reduce or eliminate the degree to which process depends on the central control unit.

In order to accomplish that objective, a controlling object sends a message comprising data on its characteristic variables over the network via data output means without being requested to do so, that is, without interference from the central control unit or other objects. The characteristic variables which the object sends are preferably adjustable. Preferably, the controlling object will send off the message when the value of at least one of its characteristic variables changes significantly. In an alternative embodiment, the controlling object sends the message at regular intervals. Preferably, an object to be controlled comprises data input means which have been set to input the data concerning predetermined characteristic variables of one or more controlling objects in the network into the object to be controlled. In this way it is possible for a controlling object to approach an object to be controlled directly without the two objects being aware of each other's existence and without the intermediary of a central control unit. One object is arranged for sending particular data, the other object is arranged for specifically receiving and processing said data. The objects are thus provided with intelligent logics which reduce the load on the control unit, as a result of which a modular process control is constructed, which is easy to extend. Preferably, the data input means are set to listen specifically to particular messages by means of a message, so that no manual adjustments of the objects are required in this connection. Said setting messages may originate from the control unit, for example, or from a (portable) computer which may be connected to the network temporarily.

DETAILED DESCRIPTION OF THE PREFERRED EMBODIMENTS

An industrial control network, such as a CAN, usually comprises a physical network comprising a number of nodes with one central control unit, for example, a number of sensors, a number of actuators and a number of PID controllers, which jointly control a production process or the climate in a building, for example. The sensors can for example measure the temperature, the pressure, the light intensity, the position, the chemical composition and the like of a process. The actuators, which are capable of influencing process parameters, may for example comprise heating elements, valves, cocks, servomotors and the like. The PID controllers thereby determine the degree to which and the manner in which the actuators respond to the signals from the sensors. In a conventional control system, all signals are passed through the central control unit, which thus controls the entire data traffic in the network. In the case of complex control networks, a high degree of expertise on the part of the operator is required for controlling such a process, tracing and remedying trouble and making changes in the network configuration.

The CAN network that is described herein has a decentralized control, wherein the tasks of the central control unit have been minimized. The invention even makes it possible for a network to function without making use of a central control unit. One feature of the objects in the present network is that each object has its own intelligence, that is, hardware and software, to carry out particular tasks independently, so that the load on the control unit is reduced, less data traffic on the network is required, the control process becomes more transparent and a possibility is created to exchange objects in the network for objects of a different type without adjustments in the central control being required. The intelligence of the objects is contained in standard interface modules, to which the (conventional) objects are linked. The format of the information that is exchanged between the various objects is standardized thereby, so that it is not necessary to take the peculiarities of the various types of objects into account.

One aspect of said decentralized control is that the sensors are so arranged that each time they detect a relevant change, they send a message comprising the new value they have measured on the network on their own accord, or send such a message at regular intervals. The actuators in the network are arranged to filter from said messages those messages that contain information that is relevant to their functioning. This process does not require any interference from a central processing unit, therefore. What is required, however, is that a setting be made, only once or each time a change occurs, if necessary, which messages an object is to send at which point in time, and which objects must listen to those messages. Said setting can take place on the interface modules of the objects themselves, but it can also be done by sending messages to said objects. In particular it can take place by setting the various connections graphically by means of connecting lines between the outputs and the inputs of objects in a graphic representation on a display screen of the system to be controlled, which is done on a computer that is connected to the network, after which the control unit sends the required messages with instructions to the various objects on the basis of said graphic representation.

Furthermore, the control method described herein provides a possibility of sending messages to objects without stating an explicit address in the form of a node ID. Also this reduces the load on the central control unit as well as the amount of data traffic on the network, because it is also possible to send a message to a particular group of objects in one go. To that end, the storage means of each object include a record comprising a number of fields, which contain object attributes. Object attributes comprise both functional attributes and location attributes, as well as status information of the object. Such a record may look as follows, for example:

| Group | Area | Location | Type of object | Variable | Value |
|---|---|---|---|---|---|
| Emergency provision | Second floor | Room 2 | Lighting | Status | On |

This record shows that the object is a lighting object, which belongs to the group of "Emergency provisions" and which is located in the area "Second floor" at location "Room 2". The object has a variable called "Status", which currently has value "On". An object may have more than one variable for that matter. In actual practice, the values of the fields will for example be represented by a character which takes up 1 byte, for example, in order to minimize the data traffic in the network. In this example, however, complete and meaningful indications are used for the sake of clarity.

When another object in the network wants to know the status of, for example, all emergency provisions on the second floor, it will send a message containing the following query on the network:

| Group | Area | Location | Type of object | Variable | Value |
|---|---|---|---|---|---|
| Emergency provision | Second floor | All | All | Status | ? |

In response thereto, each object that meets these criteria will send a message containing its current record to the querying object, so that the following result could be obtained:

| Group | Area | Location | Type of object | Variable | Value |
|---|---|---|---|---|---|
| Emergency provision | Second floor | Room 1 | Lighting | Status | Off |
| Emergency provision | Second floor | Room 1 | Sprinkler | Status | Off |
| Emergency provision | Second floor | Room 2 | Lighting | Status | Off |
| Emergency provision | Second floor | Room 3 | Lighting | Status | On |

When the emergency lighting in room 3 on the second floor must be turned off, for example, this can be done by sending a message with the following contents over the network:

| Group | Area | Location | Type of object | Variable | Value |
|---|---|---|---|---|---|
| Emergency provision | Second floor | Room 3 | Lighting | Status | Off |

In this example, the first three fields "Area", "Location", and "Type of object" jointly form a unique key, and thus a unique address for the object in question. In principle the need to allocate unique ID's to the objects is obviated when this method is used. The number of fields can be extended as required for that matter, so as to increase the selection possibilities or extend the number of objects in the network.

Generally, the message will be accepted by several objects when one or more of the fields of a message contain the wild card "All". In this manner it is for example possible within a control network to regulate the temperature in various ovens, the velocity of various conveyor belts or the rotational speed of several drive shafts by means of one message, whereby the object that sends the message does not need to know how many and which ovens, conveyor belts or drive shafts form part of the network. Furthermore this makes it possible to add or remove objects during operation, that is, without interrupting the process, without this having consequences for the control.

Furthermore it is simple to change or extend the CAN network that is described herein, or to couple two such networks (think for example of trains, truck/trailer combinations), because node ID's are set automatically so that this does not need to be done manually. This takes place in the following manner.

When a node, which may be an object, must be given a new ID, for example because it is newly introduced into the network, or because two networks have been coupled and conflicting ID's occur, the interface module of the node will generate an ID, which is derived from, for example, the last digits of its serial number, so as to prevent as much as possible different nodes generating the same ID. The node will then send an ID request comprising said ID on the network, which ID request is addressed to all nodes in the network. In CAN terms, such a message is an "RTR message", that is, a short message which, in the main, only consists of said ID and an RTR bit. In this case the RTR bit indicates that this is an ID request. The advantage of RTR messages is that several nodes are capable of sending send such messages simultaneously, and are allowed to do so. In response to said ID request, a node which already has the aforesaid ID will send a message with an ID ban for the ID in question to the requesting node, whereupon the requesting node will generate a new ID and make a new attempt. When no ID ban has been received after a predetermined period of time, the node will send an ID confirmation message containing a device identification (for example its serial number) on the network, it will adopt the ID as its own unique ID and store said ID in its permanent storage. The ID may be stored in a volatile storage, but in that case the method described herein must be repeated every time the system is started. An ID ban and an ID confirmation message have the same format for that matter (at least comprising the ID and the device identification), and they are indistinguishable from each other.

Preferably, the waiting period until the ID confirmation message is sent varies with each node, because otherwise there would be a risk of two nodes trying to send the same ID confirmation message simultaneously. This can be realised, for example, by making said waiting period dependent on at least part of the device identification (the serial number) of the object in question, or to use a random waiting period. Since different waiting periods are used, one of the two nodes will obtain the ID by being the first to send an ID ban (in the form of an ID confirmation message), as a result of which the other node will be forced to make a new attempt.

When two nodes, in spite of the above-described procedure, simultaneously try to send an ID confirmation message containing the same ID (but with a different device identification, of course), the CAN network protocol will not allow this (CAN only allows short RTR messages to be sent simultaneously). The two nodes will then continue to present the message, albeit without any result. According to the invention, this process is stopped after a number of failed attempts, for example after five attempts, after which the two nodes will assume that the ID is not available, whereupon they will send a new ID request containing a new ID.

As an additional safeguard, a first node, upon detecting an ID confirmation message containing its own ID but a different device identification, will assume that its ID is no longer valid and send a new ID request. The second node, from which the ID confirmation message originated, will do the same in response to the ID confirmation message from the first node, so that neither one of the two nodes will retain the ID in question.

Other nodes, for example the central control unit, can keep a list of the nodes that are present in the network and their ID's on the basis of the confirmation messages.

Although the present invention has been described herein by means of an exemplary embodiment, several variations thereto are possible, and consequently the present description must not be construed to be limitative in any way as regards the scope of the rights being applied for.

The invention claimed Is:

1. A method for allocating a unique identification (ID) to a node in a Controller Area Network (CAN) network that not already possesses a unique identification assigned to it and making a request to that effect, wherein the requesting node generates an ID and sends an RTR (Remote Transmission Request) message comprised of said ID and an RTR bit indicating that the message is an ID request over the network, and wherein each node in the network that already possesses said generated ID will send an ID ban comprising the generated ID over the network in response to detection of said ID request, wherein the requesting node will present an ID confirmation comprising the ID and a device identification on the network after a predetermined period of time when the requesting node has not detected an ID ban, and wherein the node will accept the ID as unique after the ID confirmation has been sent and wherein said ID is stored in permanent storage means in said node.

2. The method according to claim 1, wherein the requesting node will generate a new ID in response to the ID ban and send a new ID request comprising the new ID over the network.

3. The method according to claim 1, wherein said predetermined period of time is varied with substantially each individual node.

4. The method according to claim 1, wherein the requesting node will generate a new ID when it has not been able to send the ID confirmation after a predetermined number of attempts, and it will send a new ID request comprising a new ID over the network.

5. The method according to claim 1, wherein the requesting node, upon detection of an ID confirmation comprising the same ID but a different device identification on the network, will no longer assume its ID to be unique and it will generate a new ID and send a new ID request comprising the new ID over the network.

6. The method according to claim 1, wherein the ID is generated on the basis of at least part of the node's serial number.

7. The method according to claim 1, wherein a node sends an ID reset command over the network, in response to which at least substantially each node in the network will generate a new ID and send a new ID request comprising the new ID over the network.

8. The method according to claim 1, wherein a node does not send an ID ban over the network in response to detection of an ID request comprising an ID it will no longer use.

9. The method according to claim 1, wherein said network is an industrial control network.

* * * * *